United States Patent [19]
Voss

[11] 3,797,816
[45] Mar. 19, 1974

[54] AIR SPRING BELLOWS
[75] Inventor: Hartwig Voss, Hannover, Germany
[73] Assignee: Continental Gummi-Werke Aktiengesellschaft, Hannover, Germany
[22] Filed: Oct. 14, 1971
[21] Appl. No.: 189,384

[30] Foreign Application Priority Data
Oct. 15, 1970 Germany............................ 2050613

[52] U.S. Cl.............................................. 267/65 R
[51] Int. Cl.............................................. F16f 9/36
[58] Field of Search....... 267/64 RV, 65 RV, 65 BV

[56] References Cited
UNITED STATES PATENTS
3,063,701  11/1962  Long, Jr.................................. 267/64
3,596,895  8/1971  Hirtreiter.......................... 267/65 B Primary Examiner—James B. Marbert
Attorney, Agent, or Firm—Walter Becker

[57] ABSTRACT

An air spring bellows with two connecting sections of clearly different diameters and a conical portion interconnecting said two connecting sections while the section with the shorter diameter is connected to a metallic plunger member and the section with the greater diameter is connected to a cylinder member, the arrangement being such that a portion of the section with the smaller diameter is in response to a relative movement between said plunger and cylinder members cuffed-over another portion of the same section while the cuffed-over portion is radially outwardly spaced from the non-cuffed-over portion of the same section.

1 Claim, 2 Drawing Figures

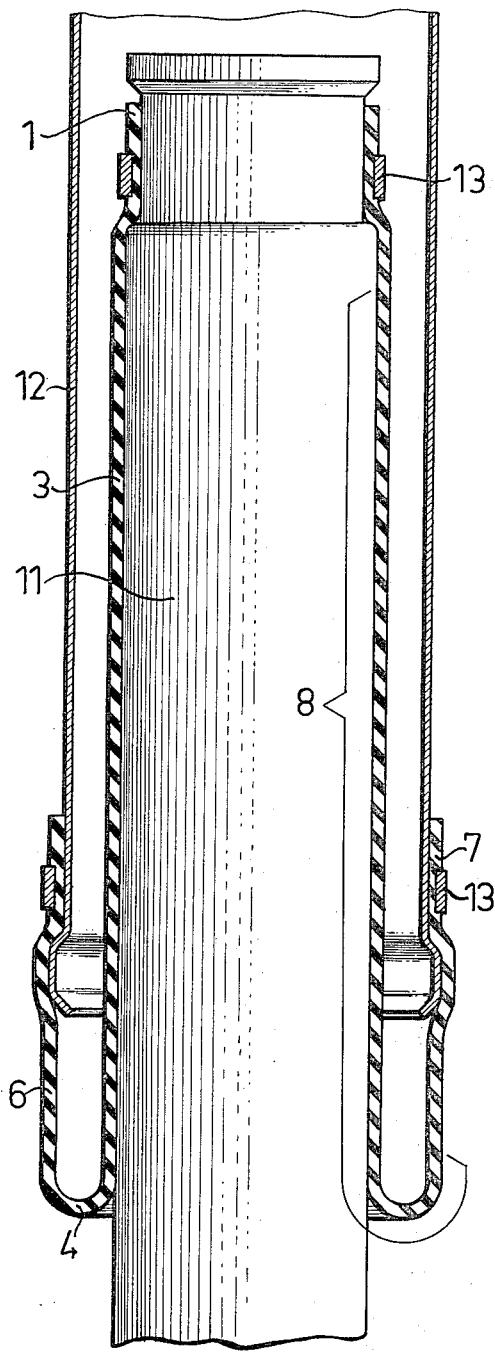
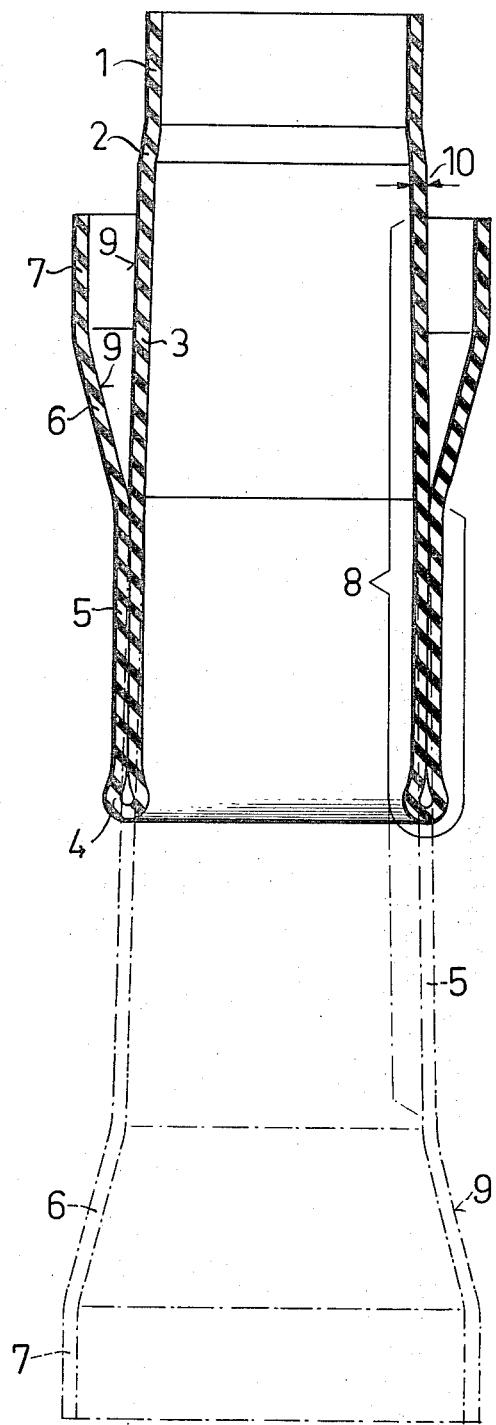

AIR SPRING BELLOWS

The present invention relates to an air spring bellows with two connecting elements respectively differing considerably in diameter and with a conical bellows wall bridging said difference. More specifically, the present invention relates to an air bellows of the above type, in which the bellows wall is by means of the smaller diameter connecting element, connected to a piston-shaped metal part, whereas by means of the inverted connecting element of greater diameter, said bellows wall is connected to a cylinder-shaped metal part so that the bellows wall will, in response to movements of the spring, roll upwardly and downwardly on the piston-shaped metal part.

The respective zone of the bellows wall which is involved in the rolling-off action will, with the heretofore known air spring bellows in view of the conical shape of the bellows wall move from bellows wall portions of smaller diameter to the bellows wall portion of greater diameter and vice versa. With large spring strokes, the piston-shaped metal part immerses deeply into the cylinder-shaped metal part, and the rolling zone is on that part of the bellows wall which has the greater diameter. The diameter of the bellows wall in the rolling zone is thus considerably greater than the diameter of the piston-shaped metal part so that a bellows acted upon by a low pressure only forms a wedge ring-shaped gap with regard to the piston-shaped metal part. This fact is without importance for air spring bellows which are completely acted upon by compressed air, inasmuch as the prevailing high air pressure presses the inner bellows wall firmly against the piston-shaped metal part. Air spring bellows, however, are, depending on the load to be absorbed, subjected to compressed air in a different manner, and at low pressure and considerable spring stroke, the engagement of the piston-shaped metal part by the inner bellows walls is not assured, the bellows wall folds so as to form folds, and consequently will be prematurely destroyed.

The invention is based on this finding, and has as its object to provide an air spring bellows with a freely rolling bellows wall which are free from folds regardless of the prevailing air pressure, and consequently, will roll in a manner free from disorders.

These and other objects and advantages of the invention will appear more clearly from the following specification, in connection with the accompanying drawings, in which:

FIG. 1 represents an axial section through a turned-in or cuffed bellows.

FIG. 2 shows the built-in or mounted bellows.

The air spring bellows according to the present invention, with two connecting members of respectively considerably different diameter and with a conical bellows wall which bridges said difference and which, by means of the smaller diameter connecting member, is connected to a piston-shaped metal part and, by means of the cuffed connecting member of greater diameter, is connected to a cylindrical metal part so that the bellows wall will, during spring movements, roll up and down on the piston-shaped metal part, is characterized in that the bellows wall in non-cuffed tension-free rest position within the rolling range has a cylindrical or slightly conical section,and as merging portion to the connecting member of greater diameter has a section which tapers to a considerably greater extent.

Thus, during the operation with great spring stroke and low inner pressure, no, or only an immaterial distance between the inner bellows wall and the piston-shaped metal part will form, inasmuch as the greater conical shape of the bellows wall can be taken out of the rolling range and can be placed into a special section of the bellows wall. The less conical section of the rolling range of the bellows wall or the cylindrical shape has no disadvantageous influence, inasmuch as the air spring bellows, in contrast to similar designed sealing sleeves, is always acted upon by air pressure even though a low air pressure, and since a friction of the inner bellows wall on the outer bellows wall will be prevented.

Expediently, according to a further development of the invention, the difference in diameters of the bellows wall in a slightly conical rolling range amounts to approximately from one to four wall thicknesses of the bellows wall. With such slight conical shape it will still be assured that also at low pressures, the inner bellows wall will engage the piston-shaped metal part.

The range with the greater conical angle has a bellows wall which is inclined toward the central axis by an angle of from 10 to 35 degrees, which angle range represents an optimum between the gradual merging from the connecting member of greater diameter to the rolling range of the bellows wall and of the required building length.

For purposes of obtaining a long life it is within the framework of the present invention, suggested that the merging areas are rounded between the slightly and considerably conical parts or cylindrical sections of the bellows wall and from the latter to the connecting parts. Moreover, the merging radii may be selected so great that the highly conical range is replaced by radii merging with each other.

For increasing the life span of the bellows, it is furthermore advantageous that the surface which in non-cuffed tension-free rest position of the bellows wall is located outside,will, following the cuffing be directed toward each other because in such an instance, — in contrast to an arrangement according to which following the cuffing the surfaces face each other with their inner surface, the bellows wall engaging the piston-shaped metal part has non-changed sides, in other words, assumes a position corresponding to the rest position.

Referring now to the drawings in detail, the air spring bellows comprises a connecting member 1 of smaller diameter, a merging section 2,and adjacent inner bellows wall 3 which is cuffed in the rolling zone 4 and merges with outer bellows wall 5, a highly conical bellows wall 6, and finally an adjacent connecting member 7 of a greater diameter. The inner bellows wall 3 and the outer bellows wall 5 together, in non-cuffed tensionless rest position (illustrated by dash lines) form a slightly conical bellows wall 3; 5 by which the rolling range 8 indicated by a bracket,is, during a spring action, stressed considerably by bending. The total of the length of the bellows wall 3, 5 is constant, while its adjusting length changes continuously. The cuffing of the air spring bellows is so effected that the outer surface 9 of the bellows wall 3; 5; 6 which are in rest position engage each other or are arranged adjacent to each other. The diameter of the slightly conical bellows wall 3; 5 is, in the vicinity of the highly conical section 6, greater by some one to four times the wall thickness 10 than in the bellows wall 5; 3 located in the vicinity of the intermediate member 2.

FIG. 2 shows an air spring bellows mounted, for instance, in a shock absorber and which by means of the connecting member 1 is connected to a piston-shaped metal part 11 of the shock absorber and by means of the connecting member 7 and clamp 13 is connected to a cylindrical metal part 12. FIG. 2 illustrates a highly compressed condition so that during the upward movement of the piston, the rolling range 8 is nearly used up. In view of the overpressure acting upon the bellows 3; 5, the highly conical part 6 is pressed almost into a cylindrical position so that the rolling zone 4 has a great rolling radius, and the inner bellows wall 3 will not be able any longer to engage the outer bellows wall 5 or the highly conical part 6.

Only the inner bellows wall 3 of the air spring bellows engages the piston-shaped metal part 11, whereas the outer bellows wall 5 is free and is prevented from being inflated only by the worked-in reinforcing inserts.

By a suitable selection of the reinforcing inserts, the outer bellows wall will assume a nearly cylindrical shape when the air spring bellows is under pressure. Independently of this design, however, also the outer bellows wall 5 and the highly conical section 6 may be supported by an outer metal mantle.

It is, of course, to be understood that the present invention is, by no means, limited to the particular showing in the drawings, but also comprises any modifications within the scope of the appended claims.

What I claim is:

1. An air spring bellows having uniform, multiple conical configuration continuous therewith and suitably operable even at nominal operating pressure, which includes in combination: a first flexible and elastic tubular section for connection to a first metallic element forming a piston, said first section having only a slightly conical contour, a second flexible and elastic tubular section having a diameter considerably greater than that of said first section for connection to a second metallic element forming a cylinder, and a third flexible elastic tubular section interconnecting said first and second sections, in transition said third section having a contour with a considerably greater conical angle than that of said first section, the difference between maximum diameter of the only slightly conical first section and the maximum diameter of the third section being within the range of from 1 to 4 times the wall thickness of the bellows, the conical angle of the third section being within the range of from 10° to 35°, said second section being adapted to be cuffed-over said first section, and in said cuffed-over condition said first and second sections being movable relative to each other with the cuffed-over portion in radially spaced relationship to the adjacent non-cuffed-over portion of said first section, the area where the only slightly conical first section merges with the second section being rounded, the area where the second section merges with said third section also being rounded, that surface of said third section which in non-cuffed condition of the bellows faces outwardly having configuration that in cuffed-over condition faces inwardly, and that area of said first section which is connected to the piston being substantially cylindrical and of a shorter diameter than the smallest diameter of the remaining portion of said first section while merging with said remaining portion of said first section along a slightly conical section, in effect there being a double conicalness of bellows wall means for eliminating the problem of lobe formation.

* * * * *